(12) United States Patent
Carbo et al.

(10) Patent No.: US 8,536,259 B2
(45) Date of Patent: Sep. 17, 2013

(54) FORMALDEHYDE FREE COATINGS FOR PANELS

(75) Inventors: Adelaida Carbo, Barrington, IL (US); Jim Thulin, Island Lake, IL (US); Mark Englert, Libertyville, IL (US); Runhai Lu, Wauconda, IL (US)

(73) Assignee: USG Interiors, LLC, Chicago, IL (US)

( * ) Notice: Subject to any disclaimer, the term of this patent is extended or adjusted under 35 U.S.C. 154(b) by 0 days.

(21) Appl. No.: 12/822,843

(22) Filed: Jun. 24, 2010

(65) Prior Publication Data

US 2011/0319543 A1  Dec. 29, 2011

(51) Int. Cl.
*C08K 3/34* (2006.01)
*C08K 3/40* (2006.01)

(52) U.S. Cl.
USPC ............ 524/423; 524/494; 524/445; 524/432; 524/447; 524/449; 428/220; 428/522; 428/530; 428/328; 428/402

(58) Field of Classification Search
USPC ................. 524/423, 494, 445, 432, 447, 449; 428/220, 522, 530, 328, 402
See application file for complete search history.

(56) References Cited

U.S. PATENT DOCUMENTS

| | | | |
|---|---|---|---|
| 1,769,519 A | 7/1930 | King et al. | |
| 3,246,063 A | 4/1966 | Podgurski | |
| 3,307,651 A | 3/1967 | Podgurski | |
| 4,016,234 A | 4/1977 | Warren et al. | |
| 4,449,978 A | 5/1984 | Iacoviello | |
| 4,484,949 A * | 11/1984 | Potter et al. | 106/798 |
| 4,489,192 A | 12/1984 | Shih et al. | |
| 4,861,822 A | 8/1989 | Keskey et al. | |
| 4,863,979 A | 9/1989 | Beyersdorf et al. | |
| 4,911,788 A | 3/1990 | Pittman et al. | |
| 4,963,603 A | 10/1990 | Felegi, Jr. et al. | |
| 5,013,598 A | 5/1991 | Guerro et al. | |
| 5,047,463 A | 9/1991 | Keskey et al. | |
| RE33,773 E | 12/1991 | Guerro et al. | |
| 5,134,179 A | 7/1992 | Felegi, Jr. et al. | |
| 5,143,954 A | 9/1992 | Hutton et al. | |
| 5,250,153 A | 10/1993 | Izard et al. | |
| 5,264,475 A | 11/1993 | Kissel | |
| 5,354,803 A | 10/1994 | Dragner et al. | |
| 5,362,798 A | 11/1994 | Hayes | |
| 5,383,756 A | 1/1995 | Coleman et al. | |
| 5,385,756 A | 1/1995 | Lofton | |
| 5,427,587 A | 6/1995 | Arkens et al. | |
| 5,494,963 A | 2/1996 | Hayes | |
| 5,556,527 A | 9/1996 | Igarashi et al. | |
| 5,661,213 A | 8/1997 | Arkens et al. | |
| 5,874,476 A | 2/1999 | Hsu et al. | |
| 5,886,306 A | 3/1999 | Patel et al. | |
| 6,071,994 A | 6/2000 | Hummerich et al. | |
| 6,099,773 A | 8/2000 | Reck et al. | |
| 6,114,464 A | 9/2000 | Reck et al. | |
| 6,136,916 A | 10/2000 | Arkens et al. | |
| 6,146,746 A * | 11/2000 | Reck et al. | 428/220 |
| 6,191,244 B1 | 2/2001 | Lau et al. | |
| 6,225,242 B1 | 5/2001 | Lau et al. | |
| 6,299,936 B1 | 10/2001 | Reck et al. | |
| 6,300,409 B2 | 10/2001 | Lau et al. | |
| 6,316,119 B1 | 11/2001 | Metzger et al. | |
| 6,443,258 B1 | 9/2002 | Putt et al. | |
| 6,481,171 B2 | 11/2002 | Yu et al. | |
| 6,585,989 B2 | 7/2003 | Herbst et al. | |
| 6,897,191 B2 | 5/2005 | Batdorf | |
| 6,902,822 B1 * | 6/2005 | Chang et al. | 428/516 |
| 6,906,132 B2 | 6/2005 | Belmares et al. | |
| 6,919,132 B2 | 7/2005 | Felegi, Jr. et al. | |
| 7,199,179 B2 | 4/2007 | Clamen et al. | |
| 7,303,766 B2 * | 12/2007 | Witham et al. | 424/490 |
| 7,364,015 B2 | 4/2008 | Englert et al. | |
| 7,399,818 B2 | 7/2008 | Bromm et al. | |
| 7,405,169 B2 | 7/2008 | Lu | |
| 2003/0236043 A1 | 12/2003 | Calzavara et al. | |
| 2004/0039098 A1 | 2/2004 | Belmares et al. | |
| 2004/0048531 A1 | 3/2004 | Belmares et al. | |
| 2004/0082240 A1 | 4/2004 | Rodrigues | |
| 2004/0082241 A1 | 4/2004 | Rodrigues | |
| 2004/0082726 A1 | 4/2004 | Rodrigues et al. | |
| 2004/0102501 A1 | 5/2004 | Lutz et al. | |
| 2004/0175407 A1 | 9/2004 | McDaniel | |
| 2004/0209071 A1 | 10/2004 | Carbo et al. | |
| 2005/0058689 A1 | 3/2005 | McDaniel | |

(Continued)

FOREIGN PATENT DOCUMENTS

| | | |
|---|---|---|
| EP | 0 583 086 A * | 7/1993 |
| EP | 0583086 A1 | 2/1994 |
| EP | 1391443 A2 | 2/2004 |
| EP | 1935933 A1 | 6/2008 |
| EP | 2085365 A1 | 8/2009 |
| WO | 2004/026918 A1 | 4/2004 |
| EP | 0990729 A1 | 4/2000 |
| EP | 1 391 443 A2 * | 2/2004 |

OTHER PUBLICATIONS

Indoor Air Quality Section et al., "Standard Practice for the Testing of Volatile Organic Emissions from Various Sources Using Small-Scale Environmental Chambers," Jul. 15, 2004.
International Search Report and Written Opinion for International PCT Application No. PCT/US2011/041021 dated Sep. 29, 2011.
European Patent Office, International Preliminary Report on Patentability and Written Opinion from PCT/US2011/041021, published as WO 2011/163102 (Jan. 10, 2013).

*Primary Examiner* — Robert D. Harlan
(74) *Attorney, Agent, or Firm* — Leydig Voit & Mayer, Ltd.; Philip T. Petti; Pradip K. Sahu (57) ABSTRACT

The invention, provides a curable, formaldehyde free coating composition comprising a composition comprising a polyacid copolymer crosslinked with a hydroxyl group-containing compound and calcium aluminosilicate powder, panels coated with the coating composition, and a method of coating a panel with the coating composition.

8 Claims, 1 Drawing Sheet

(56) References Cited

U.S. PATENT DOCUMENTS

| | | |
|---|---|---|
| 2005/0112374 A1 | 5/2005 | Jaffee et al. |
| 2005/0112978 A1 | 5/2005 | Jaffee et al. |
| 2005/0209410 A1 | 9/2005 | Bromm et al. |
| 2005/0214534 A1 | 9/2005 | Adamo et al. |
| 2006/0035097 A1 | 2/2006 | Batdorf |
| 2006/0121810 A1 | 6/2006 | Rodrigues |
| 2007/0004835 A1 | 1/2007 | Finch et al. |
| 2007/0004850 A1 | 1/2007 | Finch et al. |
| 2007/0004887 A1 | 1/2007 | Finch et al. |
| 2007/0006390 A1 | 1/2007 | Clamen et al. |
| 2007/0010651 A1 | 1/2007 | Finch et al. |
| 2007/0055012 A1 | 3/2007 | Caldwell |
| 2007/0082571 A1 | 4/2007 | Lu |
| 2007/0264895 A1 | 11/2007 | Jaffee et al. |
| 2007/0277948 A1 | 12/2007 | Carbo et al. |
| 2007/0282065 A1 | 12/2007 | Weinstein |
| 2008/0009209 A1 | 1/2008 | Clamen et al. |
| 2008/0152816 A1 | 6/2008 | Clamen et al. |
| 2008/0152817 A1 | 6/2008 | Kelly |
| 2008/0153946 A1 | 6/2008 | Kelly |
| 2008/0154013 A1 | 6/2008 | Clamen et al. |

\* cited by examiner

FORMALDEHYDE FREE COATINGS FOR PANELS

BACKGROUND OF THE INVENTION

The invention relates to polymeric or polymerizable formaldehyde-free containing materials for imparting sag resistance in panels, for example, fibrous panels and acoustical panels, such as ceiling tiles.

Acoustical panels (or tiles) are specially designed systems that are intended to improve acoustics by absorbing sound and/or reducing sound transmission in an indoor space, such as a room, hallway, conference hall, or the like. Although there are numerous types of acoustical panels, a common variety of acoustical panel is generally composed of mineral wool fibers, fillers, colorants and a binder, as disclosed, for example, in U.S. Pat. No. 1,769,519. These materials, in addition to a variety of others, can be employed to provide acoustical panels with desirable acoustical properties and other properties, such as color and appearance.

In order to prepare panels, a selected combination of fibers, fillers, bulking agents, binders, water, surfactants and other additives is combined to form a slurry and processed. Cellulosic fibers are typically in the form of recycled newsprint. The bulking agent is typically expanded perlite. Fillers may include clay, calcium carbonate or calcium sulfate. Binders may include starch, latex and reconstituted paper products linked together to create a binding system that facilitates locking all ingredients into a desired structural matrix.

Organic binders, such as starch, are often the primary component providing structural adhesion for the panel. Starch is a preferred organic binder because, among other reasons, it is relatively inexpensive. For example, panels containing newsprint, mineral wool and perlite can be bound together economically with the aid of starch. Starch imparts both strength and durability to the panel structure, but is susceptible to problems caused by moisture. Moisture can cause the panel to soften and sag, which is unsightly in a ceiling and can lead to the weakening of the panel.

One method used to counter problems caused by moisture in panels is to back-coat the panels with a melamine-formaldehyde resin based coating with or without a urea-formaldehyde component. When such a formaldehyde resin based coating is exposed to moisture or humidity it tends to resist the compressive forces on the back surface that result from the downward sagging movement.

Cured melamine-formaldehyde resins have a rigid and brittle crosslinked structure when properly cured. This rigid structure acts to resist the compressive forces on the back surface that result from the downward sagging movement. However, formaldehyde resins tend to emit formaldehyde, which is a known environmental irritant.

To decrease formaldehyde emissions, formaldehyde reactive materials, such as urea, have been added to scavenge the free formaldehyde. Unfortunately, such small molecule scavengers end cap the reactive groups of the formaldehyde resin, preventing significant levels of cross-linking from occurring. As a result, the characteristic highly cross-linked polymer structure is never formed. The resulting coating is weak and will not act to resist sag.

Although there are a variety of commercially available acoustical panel products classified as low volatile organic chemical (VOC) emitters, these products emit detectable levels of formaldehyde due to the presence of various formaldehyde emitting components that are employed in these panels. Although formaldehyde emissions that are generated during heat exposure in the manufacturing process may be exhausted into stacks or thermal oxidizers, the resulting product will still contain residual formaldehyde, which is emitted upon installation. A reduction in formaldehyde emissions, or elimination of such emissions, will provide improved indoor air quality in those locations where acoustical panels are installed, such as public buildings including schools, healthcare facilities, or office buildings.

What is needed is a coating capable of counteracting the moisture susceptibility of the panels without emitting an environmental irritant.

BRIEF SUMMARY OF THE INVENTION

The invention provides a curable, formaldehyde free coating composition for use in coating acoustical panels. The coating composition comprises (i) a composition comprising (a) a polyacid copolymer comprising at least two carboxylic acid groups, anhydride groups, or salts thereof, (b) a hydroxyl group-containing compound bearing at least two hydroxyl groups, and (c) a phosphorus-containing catalyst; and (ii) calcium aluminosilicate powder having a total alkali content of less than about 2 wt. % based on the total weight of the calcium aluminosilicate powder, wherein the ratio of the number of equivalents of said carboxylic acid groups, anhydride groups, or salts thereof to the number of equivalents of said hydroxyl groups is from about 1/0.01 to about 1/3.

The invention further provides a coated panel comprising: (a) a panel having a backing side and an opposing facing side; and (b) a formaldehyde free coating layer supported by the backing side of the panel, the coating layer including (i) a composition comprising (a) a polyacid copolymer comprising at least two carboxylic acid groups, anhydride groups, or salts thereof, (b) a hydroxyl group-containing compound bearing at least two hydroxyl groups as an independent compound, and (c) a phosphorus-containing catalyst; and (ii) calcium aluminosilicate powder having a total alkali content of less than about 2 wt. % based on the total weight of the calcium aluminosilicate powder, wherein the ratio of the number of equivalents of said carboxylic acid groups, anhydride groups, or salts thereof to the number of equivalents of said hydroxyl groups is from about 1/0.01 to about 1/3.

The invention further provides a method of coating a panel comprising: (i) providing a panel having a facing side and an opposing backing side; and (ii) applying, directly or indirectly, to the backing side of the panel a curable, formaldehyde free coating composition comprising (a) a composition comprising (a) a polyacid copolymer comprising at least two carboxylic acid groups, anhydride groups, or salts thereof, (b) a hydroxyl group-containing compound bearing at least two hydroxyl groups as an independent compound, and (c) a phosphorus-containing catalyst; and (b) calcium aluminosilicate powder having a total alkali content of less than about 2 wt. % based on the total weight of the calcium aluminosilicate powder, wherein the ratio of the number of equivalents of said carboxylic acid groups, anhydride groups, or salts thereof to the number of equivalents of said hydroxyl groups is from about 1/0.01 to about 1/3.

DETAILED DESCRIPTION OF THE INVENTION

The invention is directed to a curable, formaldehyde free coating composition comprising a composition and a calcium aluminosilicate powder. The composition comprises (a) a polyacid copolymer comprising at least two carboxylic acid groups, anhydride groups, or salts thereof, (b) a hydroxyl group-containing compound bearing at least two hydroxyl groups, and (c) a phosphorus-containing catalyst; and (ii) calcium aluminosilicate powder having a total alkali content of less than about 2 wt. % based on the total weight of the calcium aluminosilicate powder, wherein the ratio of the number of equivalents of said carboxylic acid groups, anhydride groups, or salts thereof to the number of equivalents of said hydroxyl groups is from about 1/0.01 to about 1/3.

The present invention is predicated, at least in part, on the surprising and unexpected discovery of a curable coating composition that helps impart strength and sag resistance, with particular utility in panels, that is formaldehyde free. The inventors have found that certain polymeric binders used in surface treatments and back coatings inherently contain, release, emit or generate formaldehyde. In addition, additives such as wet-state preservatives or biocides included in the surface treatments and back coatings can also release, emit or generate detectable and quantifiable levels of formaldehyde. Thus, even though formaldehyde may not be a component of a polymeric binder or a biocide as used in acoustical panel, the inventors have surprisingly found that the panel may still release, emit or generate formaldehyde for a number of reasons, including, for example, degradation of the polymeric binder and/or biocide. Advantageously, the present invention provides a coating that provides sufficient rigidity to impart strength and avoid sag while at the same time avoiding formaldehyde emissions, thereby improving indoor air quality.

The coating composition of the present invention is suitable for use in coating a front and/or back side of a panel such as a fibrous panel (e.g., an acoustical panel such as ceiling tile). The coating composition of the invention can be used with acoustical panels known in the art and prepared by methods known in the art, including acoustical panels prepared by a water-felting method such as AURATONE® ceiling tile (USG Interiors, Inc.) as well as acoustical panels prepared by a wet pulp molding or cast process such as ACOUSTONE® ceiling tile (USG Interiors, Inc.). For example, acoustical panels and the preparation thereof are described in, for example, U.S. Pat. Nos. 1,769,519, 3,246, 063, 3,307,651, 4,911,788, 6,443,258, 6,919,132, and 7,364, 015, each of which are incorporated herein by reference.

The formaldehyde free composition comprises a polyacid copolymer comprising at least two carboxylic acid groups, anhydride groups, or salts thereof. Without wishing to be bound by any particular theory, it is believed that the composition described herein serves as a binder for the calcium aluminosilicate powder and is referred to herein as a binder composition. Preferably, the compound is a carboxylated acrylic polymer. The polyacid must be sufficiently nonvolatile that it will substantially remain available for reaction with the polyol in the composition during heating and curing operations. The polyacid can be a compound with a molecular weight less than 1000 bearing at least two carboxylic acid groups, anhydride groups, or salts thereof such as, for example, citric acid, butane tricarboxylic acid, and cyclobutane tetracarboxylic acid or it can be an addition polymer or oligomer including, as polymerized units, carboxylic acid-functional monomers. Other suitable carboxylic acid group-containing monomers include, for example, methacrylic acid, acrylic acid, crotonic acid, fumaric acid, maleic acid, 2-methyl maleic acid, itaconic acid, citraconic acid, mesaconic acid, cyclohexenedicarboxylic acid, 2-methyl itaconic acid, α-methylene glutaric acid, monoalkyl maleates, and monoalkyl fumarates, and salts thereof. Suitable anhydride group-containing monomers include, for example, maleic anhydride, itaconic anhydride, acrylic anhydride, and methacrylic anhydride, and salts thereof.

Preferably the binder composition comprises a compound containing carboxylic acid groups and more preferably the binder composition comprises a compound containing methacrylic acid and/or acrylic acid groups. The compound containing carboxylic acid groups can comprise any suitable amount of monomers including carboxylic acid groups, anhydride groups, or salts. Typically, the compound comprises about 1% or more, e.g., about 2% or more, or about 5% or more, or about 10% or more, or about 20% or more, or 30% or more, of monomers including carboxylic acid groups, anhydride groups, or salts, based on the weight of the polymer. Alternatively, or in addition, the compound comprises about 99% or less, e.g., about 98% or less, or about 95% or less, or about 90% or less, or about 80% or more, of monomers including carboxylic acid groups, anhydride groups, or salts, based on the weight of the polymer. Thus, compound containing carboxylic acid groups can comprise monomers including carboxylic acid groups, anhydride groups, or salts in an amount bounded by any two of the above endpoints recited for the monomers. For example the compound containing carboxylic acid groups can comprise about 1% to about 99%, about 2% to about 98%, about 5% to about 95%, or about 10% to about 90% of monomers including carboxylic acid groups, anhydride groups, or salts, based on the weight of the polymer.

The binder composition further comprises a hydroxyl group-containing compound bearing at least two hydroxyl groups. The hydroxyl group-containing compound can be present in the curable binder composition as an independent compound or can be incorporated into the polyacid copolymer backbone. The hydroxyl group-containing compound can be any suitable polyol that is sufficiently nonvolatile that it will remain substantially available for reaction with the polyacid in the composition during heating and curing. The polyol desirably is a compound with a molecular weight less than about 1000 bearing at least two hydroxyl groups such as, for example, ethylene glycol, glycerol, pentaerythritol, trimethylol propane, sorbitol, sucrose, glucose, resorcinol, catechol, pyrogallol, glycolated ureas, 1,4-cyclohexane diol, diethanolamine, triethanolamine and certain reactive polyols such as, for example, β-hydroxyalkylamides such as, for example, bis-[N,N-di(β-hydroxyethyl)]adipamide, as may be prepared according to the teachings of U.S. Pat. No. 4,076, 917, or it may be an addition polymer containing at least two hydroxyl groups such as, for example, polyvinyl alcohol, partially hydrolyzed polyvinyl acetate, and homopolymers or copolymers of hydroxyethyl(meth)acrylate, hydroxypropyl (meth)acrylate and the like. Preferably the hydroxyl group-containing compound is a hydroxyl-containing amine selected from the group consisting of diisopropanolamine, 2-(2-aminoethylamino)ethanol, triethanolamine, tris(hydroxymethyl)aminomethane, and diethanolamine.

The polyacid copolymer is polyesterified with the hydroxyl group-containing compound so as to form the formaldehyde-free composition as a polyester. The ratio of the number of equivalents of said carboxylic acid groups, anhydride groups, or salts thereof to the number of equivalents of said hydroxyl groups is from about 1/0.01 to about 1/3 (e.g., from about 1/0.05 to about 1/2.5, or from about 1/0.1 to about 1/2).

The binder composition further comprises a phosphorus-containing catalyst. The phosphorus-containing catalyst can be any suitable compound. Preferably the phosphorus-containing catalyst is selected from the group consisting of an alkali metal hypophosphite salt such as for example sodium hypophosphite, an alkali metal phosphate such as for example sodium phosphate, an alkali metal polyphosphate, an alkali metal dihydrogen phosphate, a polyphosphoric acid, a $C_{1-22}$ alkyl phosphinic acid, or combinations thereof.

Preferably, the binder composition is an Aquaset™ polymer available from Dow Chemical Co. (Midland, Mich.). More preferably, the binder composition is Aquaset™ 600 polymer available from Dow Chemical Co.

In other embodiments, the phosphorous-containing catalyst is an oligomer or polymer bearing phosphorus-containing groups such as, for example, an oligomer or polymer of acrylic acid and/or maleic acid formed in the presence of sodium hypophosphite; addition polymers such as for example the copolymer component of the present invention prepared from ethylenically unsaturated monomers in the presence of phosphorous salt chain transfer agents or terminators; and addition polymers containing acid-function monomer residues such as, for example, copolymerized phosphoethyl methacrylate, and like phosphonic acid esters and copolymerized vinyl sulfonic acid monomers and their salts. In one embodiment of the invention, the hydroxyl-containing compound and the phosphorous-containing compound are present in the same addition polymer. Preferably, the phosphorous-containing catalyst can be used at a level of about 0 wt. % or more, e.g., about 5 wt. % or more, or about 10 wt. % or more, based on the weight of the oligomer or polymer. Alternatively, or in addition, the phosphorous-containing catalyst can be used at a level of about 40 wt. % or less, e.g., about 35 wt. % or less, or about 30 wt. % or less, or about 25 wt. % or less, or about 20 wt. % or less, based on the weight of the oligomer or polymer. Thus, the phosphorous-containing catalyst can be used at a level bounded by any two of the above endpoints recited for the phosphorous-containing catalyst. For example, the phosphorous-containing catalyst can be used at a level of from about 0 wt. % to about 40 wt. %, e.g., from about 0 wt. % to about 30 wt. %, from about 0 wt. % to about 20 wt. %, or from about 0 wt. % to about 10 wt. %, based on the weight of the oligomer or polymer.

In addition to the curable formaldehyde free binder composition, the coating composition of the invention comprises powder comprising, consisting essentially of, or consisting of calcium aluminosilicate powder. As used herein, the term "glass powder" or "glass filler" is intended to refer to powder(s) comprises powder comprising, consisting essentially of, or consisting of calcium aluminosilicate powder. The calcium aluminosilicate powder can be any suitable calcium aluminosilicate powder. Desirable calcium aluminosilicate powders provide chemical inertness with very low oil and water absorption. While not wishing to be bound by theory, applicants believe that the low water absorption property allows higher loading levels of the calcium aluminosilicate powder filler in the coating composition without excessive increase in viscosity. Suitable calcium aluminosilicate powders include powders made from fiberglass, for example fiberglass recycled from post-industrial glass feedstock. Preferably the calcium aluminosilicate powder has a total alkali content of less than about 2 wt. % (e.g., E-glass) based on the total weight of the calcium aluminosilicate powder. Desirably the calcium aluminosilicate powder does not contain a substantial amount of, or any amount of, chopped calcium aluminosilicate fiber such that the calcium aluminosilicate powder has an average aspect ratio of about 5:1 or less, preferably about 3:1 or less, or more preferably about 2:1 or less (e.g., about 1.5:1 or less).

The calcium aluminosilicate powder can have any suitable median particle size and/or surface area. Typically the calcium aluminosilicate powder has a median particle size of about 250 microns or less, preferably 100 microns or less, and more preferably 20 microns or less (e.g., about 15 microns or less, or about 10 microns or less). The calcium aluminosilicate powder desirably has a surface area of about 1 $m^2/g$ to about 3 $m^2/g$ and preferably has a surface area of about 1.2 $m^2/g$ to about 2.4 $m^2/g$. While not wishing to be bound by theory, applicants believe that finely divided ground powder provides a higher surface area for maximum interaction with the coating binder, reinforcing and enhancing the mechanical properties of the curable coating composition and increasing the stiffness and strength of the film coating once applied to the panel, thereby enhancing sag resistance.

The coating composition optionally further comprises one or more components selected from the group consisting of dispersants, mineral fillers, pigments, surfactants, pH modifiers, buffering agents, viscosity modifiers, stabilizers, defoamers, flow modifiers, and combinations thereof.

Suitable dispersants include, for example, tetrapotassium pyrophosphate (TKPP) (FMC Corp.), sodium polycarboxylates such as Tamol® 731A (Rohm & Haas) and nonionic surfactants such as Triton™ CF-10 alkyl aryl polyether (Dow Chemicals). Preferably the coating composition comprises a dispersant selected from nonionic surfactants such as Triton™ CF-10 alkyl aryl polyether (Dow Chemicals).

Suitable mineral fillers (in addition to the calcium aluminosilicate powder discussed above) include, for example, brighteners, clay (e.g., kaolin clay), mica, sand, barium sulfate, silica, talc, gypsum, wollastonite, zinc oxide, zinc sulfate, hollow beads, bentonite salts, and mixtures thereof. Preferably, the coating composition does not contain a mineral filler (e.g., the coating composition does not contain mica). However, if desired, mineral filler such as mica can be included in the composition, alone or in combination with another filler such as calcium aluminosilicate powder as described herein. If included in some embodiments of the coating composition, the mica can have a particle size of about 250 microns or less, preferably 100 microns or less, and more preferably 20 microns or less (e.g., about 15 microns or less, or about 10 microns or less).

Suitable pigments include conventional pigments familiar to those skilled in the art. Care must be taken to avoid those pigments that would raise the pH of the coating and thus inhibit curing of the binder. Preferably the coating composition is not pigmented when used as a backcoating to promote sag resistance.

Suitable surfactants are preferably nonionic surfactants. Non-limiting examples of suitable nonionic surfactants include ethoxylated nonylphenol such as Igepal® CO-630 (Rhodia Canada, Inc.).

Suitable pH modifiers and buffer agents include sulfuric and phosphoric acids and combinations thereof. These additives are designed to provide the suitable pH environment for the curing of the binder. Preferably the coating composition comprises a pH modifier selected from either sulfuric or phosphoric acid.

Suitable viscosity modifiers include hydroxyethylcelluloses such as Natrosol® (Hercules, Inc.), carboxymethyl cellulose (CMC), sodium bentonite (Volclay), kaolin clay such as air floated kaolin clay sold as Snowbrite Clay (Whittaker, Clark & Daniels), and combinations thereof.

Suitable defoamers include oil based defoamers such as Hi-Mar DFC-19 (Hi-Mar Specialties, Inc.).

The binder composition is formaldehyde free. As used herein, "formaldehyde free" means that the binder composition is not made with formaldehyde or formaldehyde-generating chemicals and will not release formaldehyde in normal service conditions. Desirably the coating composition comprising the formaldehyde free binder composition is also formaldehyde free, or is at least substantially formaldehyde free. The term "substantially formaldehyde free" is defined as meaning that an incidental or background quantity of formaldehyde (e.g., less than 100 ppb) may be present in the coating composition and be within the scope of the invention.

The quantity of formaldehyde present in the coating composition can be determined according to ASTM D5197 by heating dried coating samples to 115° C. in a humidified Markes Microchamber and then collecting the emissions under controlled conditions using a 2,4-dinitrophenylhydrazine (DNPH) cartridge. Following exposure, the DNPH cartridge is washed with acetonitrile, the acetonitrile wash is diluted to a 5 ml volume, and the sample is analyzed by liquid chromatography. Results are reported in µg/mg of coating sample and compared to a control sample. Samples that are within experimental error of the control sample over a significant series of tests are substantially formaldehyde free.

The coating composition can comprise any suitable amount of formaldehyde free binder composition. Preferably the coating composition comprises about 10 wt. % or more, e.g., about 15 wt. % or more, or about 20 wt. % or more, or about 30 wt. % or more, formaldehyde free binder composition, based on the total weight of the dry components of the coating composition. Alternatively, or in addition, the coating composition comprises about 60 wt. % or less, e.g., about 55 wt. % or less, or about 50 wt. % or less formaldehyde free binder composition, based on the total weight of the dry components of the coating composition. Thus, the coating composition can comprise formaldehyde free binder composition in an amount bounded by any two of the above endpoints recited for the formaldehyde free binder composition. For example, the coating composition can comprise about 10 wt. % to about 60 wt. %, about 20 wt. % to about 55 wt. %, or about 20 wt. % to about 50 wt. % formaldehyde free binder composition, based on the total weight of the dry components of the coating composition. In addition, the coating composition can comprise any suitable amount of calcium aluminosilicate powder. Preferably the coating composition comprises about 5 wt. % or more, e.g., about 10 wt. % or more, or about 20 wt. % or more, or about 30 wt. % or more calcium aluminosilicate powder, based on the total weight of the dry components of the coating composition. Alternatively, or in addition, the coating composition comprises about 80 wt. % or less, e.g., about 70 wt. % or less, or about 65 wt. % or less calcium aluminosilicate powder, based on the total weight of the dry components of the coating composition. Thus, the coating composition can comprise calcium aluminosilicate powder in an amount bounded by any two of the above endpoints recited for the calcium aluminosilicate powder. For example, the coating composition can comprise about 30 wt. % to about 80 wt. %, about 35 wt. % to about 75 wt. %, or about 40 wt % to about 75 wt. %) calcium aluminosilicate powder, based on the total weight of the dry components of the coating composition.

The curable coating composition may be prepared by admixing the binder composition, calcium aluminosilicate powder and other optional components using conventional mixing techniques. Typically the coating particles or solids are suspended in an aqueous carrier. Typically the binder composition is added to and mixed with the aqueous carrier, followed by the other optional components in descending order according to the dry wt. % amount. The calcium aluminosilicate powder desirably is added to the mixture last to ensure adequate wetting of the powder.

The solid content of the coating composition of the invention can be as high as practical for a particular application. For example, a limiting factor regarding the choice and amount of liquid carrier used is the viscosity obtained with the required amount of solids. Thus, spraying is the most sensitive to viscosity, but other methods are less sensitive. The effective range for the solid content of the coating composition is about 15% or more, e.g., about 20 wt. % or more, or about 25 wt. % or more, or about 30 wt. % or more, or about 35 wt. % or more, or about 40 wt. % or more, or about 45 wt. % or more. Alternatively, or in addition, the solid content of the coating composition is about 90 wt. % or less, or about 85 wt. % or less, or about 80 wt. % or less, or about 75 wt. % or less. Thus, the solid content of the coating composition can be bounded by any two of the above endpoints recited for the solid content of the coating composition. For example, the solid content of the coating composition can be from about 15 wt. % to about 90 wt. %, from about 35 wt. % to about 80 wt. %, or from about 45 wt. % to about 75 wt. %.

The invention is further directed to a panel (e.g., an acoustical panel) coated with the coating composition of the invention. A coated panel 10 in accordance with one aspect of the present invention, as illustrated schematically in FIG. 1, comprises a panel core 20 having a backing side 30 and a facing side 40. The panel optionally further comprises a backing layer 35 in communication with the backing side 30, and/or a facing layer 45 in communication with the facing side 40. A back coating layer 50 is in communication with the backing side 30 or optional backing layer 35. Optionally a further front coating layer 60 is in communication with the facing side 40 or optional facing layer 45.

Figure 1:
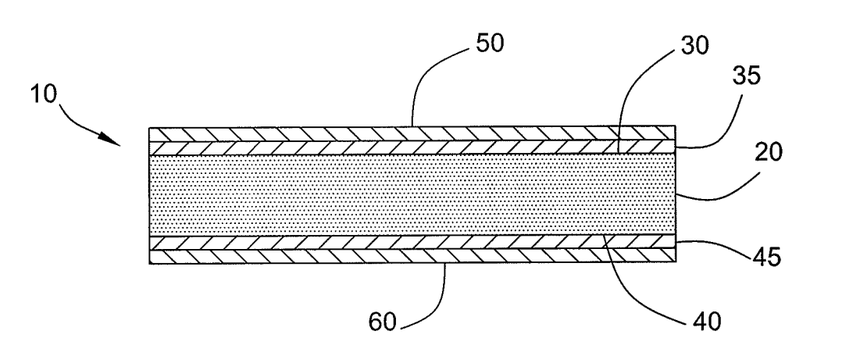
FIG. 1 schematically illustrates a perspective view of a coated panel having a back coating according to an embodiment of the invention.

The back coating layer 50 counteracts the sagging force of gravity in humid conditions, thus the layer is applied to the backing side 30 (or backing layer 35 if present) of the panel core 20. The backing side 30 may be the side that is directed to the plenum above the panel in a suspended ceiling tile system. The coated panel 10 may be an acoustical panel for attenuating sound.

An illustrative procedure for producing the panel core 20 is described in U.S. Pat. No. 1,769,519. In one aspect, the panel core 20 comprises a mineral wool fiber and a starch, wherein the mineral wool fiber can include a variety of fibers, such as slag wool, rock wool and/or basalt wool. In another aspect of the present invention, the starch component can be a starch gel, which acts as a binder for the mineral wool fiber, as is disclosed in U.S. Pat. Nos. 1,769,519, 3,246,063, and 3,307,651. In a further aspect of the present invention, the panel core 20 can comprise a glass fiber panel.

The panel core 20 of the coated panel of the invention can also include a variety of other additives and agents. For example, the panel core 20 can include a calcium sulfate material (such as, stucco, gypsum and/or anhydrite), boric acid and sodium hexametaphosphate (SHMP). Kaolin clay and guar gum may be substituted for stucco and boric acid when manufacturing acoustical tile.

The core of the coated panel of the present invention can be prepared using a variety of techniques. In one embodiment, the panel core 20 is prepared by a wet- or water-felted process, as is described in U.S. Pat. Nos. 4,911,788 and 6,919,132. In another embodiment, panel core 20 is prepared by combining and mixing starch and a variety of additives in water to provide a slurry. The slurry is heated to cook the starch and create the starch gel, which is then mixed with mineral wool fiber. This combination of gel, additives, and mineral wool fiber (referred to as "pulp") is metered into trays in a continuous process. The bottom of the trays into which the pulp is metered can optionally contain a backing layer 35

(for example, a bleached paper, unbleached paper, or kraft paper-backed aluminum foil, hereinafter referred to as kraft/aluminum foil), which serves to aid in the release of the material from the tray, but also remains as part of the finished product. The surface of the pulp can be patterned, and the trays containing the pulp can be subsequently dried, for example, by transporting them through a convection tunnel dryer. Next, the dried product or slab can be fed into a finishing line, where it may be cut to size to provide the panel core 20. The panel core 20 can then be converted to the panel of the present invention by application of the coating composition of the invention. The coating composition is preferably applied to the panel core 20 after the core has been formed and dried. In yet another embodiment, panel core 20 is prepared according to the method described in U.S. Pat. No. 7,364,015, which is incorporated by reference herein. Specifically, the panel core 20 comprises an acoustical layer comprising an interlocking matrix of set gypsum, which can be a monolithic layer or can be a multi-layer composite. Desirably panel core 20 is prepared on a conventional gypsum wallboard manufacturing line, wherein a ribbon of acoustical panel precursor is formed by casting a mixture of water, calcined gypsum, foaming agent, and optionally cellulosic fiber (e.g., paper fiber), lightweight aggregate (e.g., expanded polystyrene), binder (e.g., starch, latex), and/or enhancing material (e.g., sodium trimetaphosphate) on a conveyor belt. In a preferred embodiment, the panel core comprises a backing sheet (e.g., paper, metallic foil, or combination thereof), optionally coated with scrim layer (e.g., paper, woven or nonwoven fiberglass) and/or densified layer precursor comprising calcined gypsum and having a density of at least about 35 lbs/ft$^3$. In yet another embodiment, panel core 20 is prepared according to the wet-felting process. In the wet-felting process, an aqueous slurry of the panel-forming materials including mineral wool, expanded perlite, starch and minor additives, are deposited onto a moving wire screen, such as a Fourdrinier or cylinder former. On the wire screen of a Fourdrinier, a wet mat is formed by dewatering the aqueous slurry by gravity and then optionally by vacuum suction. The wet mat is pressed to a desired thickness between press rolls for additional dewatering. The pressed mat is dried in ovens and then cut to produce acoustical panels. The panel core 20 can then be converted to the panel of the present invention by application of the coating composition of the invention. The coating composition is preferably applied to the panel core 20 after the core has been formed and dried.

In a further embodiment, the panel core 20 can include, as a preservative, one or more formaldehyde-free biocides, as described in U.S. Patent Application Publication 2007/0277948 A1, which is incorporated by reference herein. Suitable formaldehyde-free biocides include 1,2-benzisothiazolin-3-one, available as Proxel® GXL or Proxel® CRL (ARCH Chemicals), Nalcon® (Nalco), Canguard™ BIT (Dow Chemical), and Rocima™ BT 1S (Rohm & Haas). Other isothiazolin-3-ones include blends of 1,2-benzisothiazolin-3-one and 2-methyl-4-isothiazolin-3-one, available as Acticide® MBS (Acti-Chem). Additional isothiazolin-3-ones include 5-chloro-2-methyl-4-isothiazolin-3-one, 2-methyl-4-isothiazoline-3-one, and blends thereof. Blends of 5-chloro-2-methyl-4-isothiazolin-3-one and 2-methyl-4-isothiazoline-3-one are available as Kathon™ LX (Rohm & Haas), Mergal® K14 (Troy Chemical), and Amerstat® 251 (Drew Chemical). Another suitable formaldehyde-free biocide includes zinc 1-hydroxy-2(1H)-pyridinethione, available as Zinc Omadine® (ARCH Chemicals), and is preferably effective in both the dry state and the wet state. Zinc 1-hydroxy-2(1H)-pyridinethione can also be employed with zinc oxide, available as Zinc Omadine® emulsion. Other suitable formaldehyde-free biocides include 2-n-octyl-4-isothiazolin-3-one, available as Kathon™ 893 and Skane® M-8 (Rohm & Haas), and 2-(4-thiazolyl)-benzimidazole, available as Metasol® TK-100 (LanXess).

As previously discussed, the coated panel in accordance with the present invention can optionally include the backing layer 35. Numerous materials can be employed as the backing layer 35, including unbleached paper, bleached paper, kraft/aluminum foil, and the like. A flame resistant back coating optionally can be applied in combination with bleached or unbleached paper backing to improve the products surface burning characteristics. The flame resistant back coating can include a variety of components, such as, for example, water, a flame retardant, and a biocide. The backing layer 35 may also be employed for improving sag resistance and/or sound control. In addition, a fill coating or a plurality of fill coatings may also be applied to the backing layer 35. The fill coating can include a variety of components, such as, for example, water, fillers, binders, and various other additives, such as defoamers, biocides, and dispersants.

An additional embodiment of the invention includes a method of coating a panel including the steps of applying the coating composition. The coating composition can be applied to one or more surfaces of a panel, preferably an acoustical panel or acoustical tile substrate, using a variety of techniques readily known to and available to those skilled in the art. Such techniques include, for example, airless spraying systems, air assisted spraying systems, and the like. The coating may be applied by such methods as roll coating, flow coating, flood coating, spraying, curtain coating, extrusion, knife coating and combinations thereof. The effective range for the application rate for this coating is on dry basis from about 2 g/ft$^2$ to about 200 g/ft$^2$, from about 3 g/ft$^2$ to about 20 g/ft$^2$, and from 4.0 g/ft$^2$ to about 10 g/ft$^2$. In an embodiment, the coating composition of the invention is applied to the backing side 30 of the panel. In another embodiment, the coating composition of the invention is applied to the backing layer 35 of the panel.

After the curable coating composition of the invention has been applied to the panel, it is heated to effect drying and curing. Drying the resulting product removes any water used as a carrier for the coating composition or any of the components thereof and converts the polymer binder into a structural, rigid network to provide surface treatment. By "curing" is meant herein a chemical or morphological change that is sufficient to alter the properties of the polymer, such as, for example, via covalent chemical reaction, ionic interaction or clustering, improved adhesion to the panel, phase transformation or inversion, hydrogen bonding, and the like.

The duration, and temperature of heating, will affect the rate of drying, ease of processing or handling, and property development of the heated substrate. Heat treatment at from about 100° C. to about 400° C. (e.g., about 175° C. to about 370° C., or about 200° C. to about 215° C.) for a period of from about 3 seconds to about 15 minutes can be carried out. For acoustical panels, treatment at from 175° C. to 280° C. is preferred. Generally, a coating surface temperature of about 200° C. is indicative of a full cure.

The drying and curing functions can be effected in two or more distinct steps, if desired. For example, the curable coating composition can be first heated at a temperature, and for a time, sufficient to substantially dry, but not to substantially cure the composition, and then heated for a second time, at a higher temperature, and/or for a longer period of time, to effect curing. Such a procedure, referred to as "B-staging," can be used to provide coated panels in accordance with the invention.

The coated panel of the invention has increased resistance to permanent deformation (sag resistance). Desirably the coated panel of the invention has a sag resistance, as determined according to ASTM C367-09, of less than about 0.4 inch per two foot length of said coated panel, preferably less than about 0.3 inch per two foot length of said coated panel, and more preferably less than about 0.2 inch per two foot length of said coated panel.

The coated panel of the invention desirably is substantially formaldehyde free, meaning that it releases or emits formaldehyde at a level that meets Section 01350 of the California Collaborative for High Performance Schools Special Environmental Requirements. To be considered substantially formaldehyde free, the coated panel should provide a calculated concentration of formaldehyde of 16.5 µg/m$^3$ or less.

The following examples further illustrate the invention but, of course, should not be construed as in any way limiting its scope.

EXAMPLE 1

This example demonstrates the sag resistance properties of acoustical panels prepared and coated with a coating composition of the invention.

In this example, a series of coated acoustical panels were produced and tested for sag resistance. The first panel was prepared using conventional melamine formaldehyde binder and was used as a control (composition 1A). The next four panels were prepared using a coating composition comprising a formaldehyde free binder composition comprising Aquaset® 600 polymer binder (Dow Construction Polymers) in combination with one of four different calcium aluminosilicate powders as follows: LA-7™ (Vitro Minerals) glass powder having a medium particle size of 7.27 microns and surface area of 2.1 m$^2$/g (composition 1B); LA100™ (Vitro Minerals) glass powder (composition 1C); LA300™ (Vitro Minerals) glass powder having a medium particle size of 10.46 microns and surface area of 1.2 m$^2$/g (composition 1D); LA400™ (Vitro Minerals) glass powder having a medium particle size of 7.04 microns and surface area of 2.1 m$^2$/g (composition 1E). The compositions for each of these coatings is set forth in Table 1A.

TABLE 1A

| Component | 1A | 1B | 1C | 1D | 1E |
| --- | --- | --- | --- | --- | --- |
| water | 1689 g | 200 g | 200 g | 200 g | 300 g |
| nonionic alkyl aryl polyether surfactant (Triton ™ CF-10, Dow) | 5 g | 3 g | 3 g | 3 g | 3 g |
| carboxymethylcellulose | 0 g | 2.5 g | 2.5 g | 2.5 g | 2.5 g |
| sodium bentonite | 25 g | 7.5 g | 7.5 g | 7.5 g | 7.5 g |
| kaolin clay | 800 g | 37.5 g | 37.5 g | 37.5 g | 37.5 g |
| Q-200 | 2500 g | — | — | — | — |
| LA-15 | 1714 g | — | — | — | — |
| Aquaset ® 600 | — | 400 g | 400 g | 400 g | 400 g |
| glass powder | — | 362.5 g | 362.5 g | 362.5 g | 362.5 g |

Each composition was applied to the backside of an acoustical panel (ground 2310 Auratone® basemat with no coatings or other finishing steps applied) using a two-step application method consisting of first applying 12 g of coating (at 18 g/ft$^2$), and then applying 6 g of coating (at 18 g/ft$^2$). The resulting coating was cured at 260° C. for 10 minutes. All of the coating compositions of the invention (1B-1E) had coating application and sag resistance properties equal to or better than the melamine formaldehyde control (1A). The sag resistance properties of each panel were measured according to ASTM C367-09 after three cycles at 40° C./95% humidity for 12 hours followed by 21° C./50% humidity for 12 hours. The sag resistance was measured as total movement (TM) of the panel and as position relative to flat plane (PRFP). Table 1B summarizes these properties.

TABLE 1B

| | 1A | 1B | 1C | 1D | 1E |
| --- | --- | --- | --- | --- | --- |
| application viscosity | | very good 88 | excellent 77 | excellent 78 | excellent 76 |
| sag - TM (inches) | 0.197 | 0.083 | 0.126 | 0.04 | 0.078 |
| sag - PRFP (inches) | 0.383 | 0.037 | 0.144 | 0.015 | 0.078 |

These data demonstrate that coating compositions in accordance with the invention comprising formaldehyde free binder compositions in combination with calcium aluminosilicate power provide sag resistance properties that are equal to or better than conventional melamine formaldehyde compositions.

EXAMPLE 2

This example demonstrates the effect of the cure temperature on the sag performance of a coating composition in accordance with an embodiment of the invention.

Four test strips were prepared by applying a coating composition to four 7.6 cm×61 cm wet-felted test strips (ground 2310 Auratone® basemat with no coatings or other finishing steps applied). The coating composition comprised 203.7 g Aquaset™ polymer binder (Dow Construction Polymers), 158.1 g LA-7™ glass powder (Vitro Minerals), 1.38 g Triton CF-10 surfactant (Dow Chemical), 5.50 g Snowbrite™ clay (Unimin), and 71.30 g water.

The coating composition was applied using a Devilbiss JGA-510 spray gun to 7.6 cm×61 cm wet-felted test strips at an application rate of 130 g/m$^2$ on a wet basis. The test strips were dried in an oven at approximately 135° C. for 20-30 minutes.

The sag resistance properties of each strip were measured according to ASTM C367-09 after three cycles at 40° C./95% humidity for 12 hours followed by 21° C./50% humidity for 12 hours. A set of six strips was heat treated after initial drying at 135° C. for 20-30 minutes. Two strips were sag tested without additional heating, two strips were heat-treated at 177° C. for 10 minutes and two strips were heat-treated 177° C. for 20 minutes. A second set of six strips was heat-treated at 204° C. for 0, 10 and 20 minutes respectively. The sag resistance was measured as total movement (TM) of the strip and as position relative to flat plane (PRFP). The total movement (TM) of the strip results are set forth in Table 2A and the position relative to flat plane (PRFP) are set forth in Table 2B.

TABLE 2A (Total Movement)

| | |
|---|---|
| TM after 0 min at 177° C. | 4.69 cm |
| TM after 10 min at 177° C. | 4.02 cm |
| TM after 20 min at 177° C. | 2.12 cm |
| TM after 0 min at 204° C. | 4.47 cm |
| TM after 10 min at 204° C. | 1.33 cm |
| TM after 10 min at 204° C. | 1.20 cm |

TABLE 2B (Position Relative to Flat Plane)

| | |
|---|---|
| PRFP after 0 min at 177° C. | 4.80 cm |
| PRFP after 10 min at 177° C. | 3.92 cm |
| PRFP after 20 min at 177° C. | 2.21 cm |
| PRFP after 0 min at 204° C. | 4.58 cm |
| PRFP after 10 min at 204° C. | 1.69 cm |
| PRFP after 10 min at 204° C. | 1.47 cm |

As is apparent from the results set forth in Tables 2A and 2B, the test strip cured at 204° C. for 10 min exhibited total movement and position relative to flat plane approximately 33% and 43% of the test strip cured at 177° C. for 10 min. The test strip cured at 204° C. for 20 min exhibited total movement and position relative to flat plane approximately 57% and 66% of the test strip cured at 177° C. for 20 min.

EXAMPLE 3

This example demonstrates the effect of the particle size of glass fillers on the sag performance of a coating composition in accordance with an embodiment of the invention.

Four coating compositions were prepared (Compositions 3A-3D). Each of Compositions 3A-3D comprised 1.50 wt. % of a nonionic alkyl aryl polyether surfactant (Triton™ CF-10, Dow), 0.40 wt. % hydroxyethylcellulose (Cellosize™ QP-4400H, Dow Chemical), 1.20 wt. % bentonite clay (Vollclay™, American Colloid Company), 6.00 wt. % air-floated kaolin clay (Snowbrite™ clay, Unimin), and 40.0 wt. % (on a solids basis) Aquaset™ 600 polymer binder (Dow Construction Polymers). Compositions 3A-3D further comprised 50.90 wt. % of one of four glass fillers as follows: Composition 3A, LA-7 (Vitro Minerals), 10.5 μm particle size; Composition 3B, Ameriflake ACFT1-300 (ISORCA), 72.1 μm particle size; Composition 3C, Grainger 325 mesh (Glass Resources, Inc.), 77.7 μm particle size; and Composition 3D, TriVitro™ VG200, 31.4 μm particle size. The balance of Compositions 3A-3D (to achieve a 45% solids coating) was water.

The coating composition was applied to the test panels using a Devilbiss JGA-510 spray gun to 7.6 cm×61 cm wet-felted test strips at an application rate on a wet basis as set forth in Table 3. The coated test strips were then dried in an oven at approximately 135° C. and then cured for 20 minutes at 177° C.

The sag resistance properties of each panel were measured according to ASTM C473-95 after three cycles at 40° C./95% humidity for 12 hours followed by 21° C./50% humidity for 12 hours. The sag resistance was measured as total movement (TM) of the panel and as position relative to flat plane (PRFP). The actual coating application, the total movement of the panel, and the final position relative to flat plane are set forth in Table 3.

TABLE 3

| Composition | Particle Size of Glass Filler (μm) | Coating Usage (g/m²) | TM (cm) | PRFP (cm) |
|---|---|---|---|---|
| 3A | 10.5 | 203 | 0.899 | 1.290 |
| 3A | 10.5 | 227 | 0.533 | 1.001 |
| 3B | 72.1 | 191 | 2.276 | 2.827 |
| 3B | 72.1 | 195 | 2.380 | 3.007 |
| 3C | 77.7 | 202 | 3.774 | 4.148 |
| 3C | 77.7 | 240 | 3.508 | 3.924 |
| 3D | 31.4 | 214 | 2.545 | 2.924 |
| 3D | 31.4 | 187 | 3.236 | 3.589 |

As is apparent from the results set forth in Table 3, Composition 3A, which contained a glass filler having a particle size of 10.5 μm, exhibited less total movement of the panel and a smaller position relative to flat plane (indicating a flatter strip) than Compositions 3B, 3C, or 3D, which contained glass fillers having particle sizes of 72.1, 77.7 μm, and 31.4 μm, respectively.

EXAMPLE 4

This example demonstrates the sag resistance as a function of resin loading of a coating composition in accordance with an embodiment of the invention.

Seven coating compositions were prepared (Compositions 4A-4G). Each of Compositions 4A-4G comprised 1.50 wt. % of a nonionic alkyl aryl polyether surfactant (Triton™ CF-10, Dow), 0.40 wt. % hydroxyethylcellulose (Cellosize™ QP-4400H, Dow Chemical), 1.20 wt. % bentonite clay (Vollclay™, American Colloid Company), 6.00 wt. % air-floated kaolin clay (Snowbrite™ clay, Unimin), a resin (Aquaset™ 600 polymer binder, Dow Construction Polymers), and a glass filler (LA-7, Vitro Minerals), with the balance being water to achieve a 45% solids coating. The amount of solids provided by Aquaset™ 600 polymer binder and the amount of glass filler, expressed as wt. % based on the total weight of the compositions, are set forth in Table 4A.

TABLE 4A

| Composition | 4A | 4B | 4C | 4D | 4E | 4F | 4G |
|---|---|---|---|---|---|---|---|
| Aquaset™ 600 polymer binder (% solids) | 10.00 | 20.00 | 30.00 | 40.00 | 50.00 | 60.00 | 70.00 |
| LA-7 glass filler (% solids) | 80.90 | 70.90 | 60.90 | 50.90 | 40.90 | 30.90 | 20.90 |

The coating composition was applied using a Devilbiss JGA-510 spray gun to two 7.6 cm×61 cm wet-felted test strips at an application rate on a wet basis as set forth in Table 4B. The coated test strips were then dried in an oven at approximately 135° C. and then cured for 20 minutes at 177° C.

The sag resistance properties of each strip were measured according to ASTM C473-95 after three cycles at 40° C./95% humidity for 12 hours followed by 21° C./50% humidity for 12 hours. The sag resistance was measured as total movement (TM) of the strip and as position relative to flat plane (PRFP). The actual coating application, the total movement of the strip, and the final position relative to flat plane are set forth in Table 4B. A control strip did not have any coating.

TABLE 4B

| Strip | Composition | Coating Usage (g/m²) | TM (cm) | PRFP (cm) |
|---|---|---|---|---|
| 1 | 4A | 200 | 3.513 | 3.962 |
| 2 | 4A | 204 | 3.635 | 4.069 |
| 3 | 4B | 191 | 4.808 | 5.212 |
| 4 | 4B | 191 | 4.133 | 4.468 |
| 5 | 4C | 199 | 2.070 | 2.474 |
| 6 | 4C | 207 | 1.864 | 2.304 |
| 7 | 4D | 203 | 0.899 | 1.290 |
| 8 | 4D | 227 | 0.533 | 1.001 |
| 9 | 4E | 197 | 0.975 | 1.402 |
| 10 | 4E | 207 | 1.300 | 1.781 |
| 11 | 4F | 196 | 2.189 | 2.685 |
| 12 | 4F | 188 | 1.984 | 2.487 |
| 13 | 4G | 202 | 1.588 | 2.085 |
| 14 | 4G | 195 | 1.961 | 2.482 |
| 15 | Control (no coating) | No coating applied | 5.570 | 5.474 |

As is apparent from the results set forth in Table 4B, the final total movement (TM) and the position relative to flat plane (PRFP) was at a minimum for Compositions 4D and 4E, which contained 40.0 wt. % and 50.0 wt. % on a solids basis of Aquaset™ 600 polymer binder and 50.90 wt. % and 40.90 wt. % of LA-7 glass filler, respectively.

EXAMPLE 5

This example demonstrates the effect of a glass filler and a mica filler on the sag performance of a coating composition in accordance with an embodiment of the invention.

Two coating compositions were prepared (Compositions 5A and 5B). Each composition contained 1.50 wt. % of a nonionic alkyl aryl polyether surfactant (Triton™ CF-10, Dow), 0.40 wt. % hydroxyethylcellulose (Cellosize™ QP-4400H, Dow Chemical), 1.20 wt. % bentonite clay (Vollclay™, American Colloid Company), 6.00 wt. % air-floated kaolin clay (Snowbrite™ clay, Unimin), and 39.50 wt. % on a solids basis of a resin (Aquaset™ 600 polymer binder, Dow Construction Polymers). Composition 5A further contained 35.80 wt. % of a glass filler (LA-7™, Vitro Minerals). Composition 5B further contained 35.80 wt. % of mica (Mineralite Mica 3×, Mineral Mining Company).

The coating composition was applied using a Devilbiss JGA-510 spray gun to two 7.6 cm×61 cm wet-felted test strips at an application rate of 194 g/m² on a wet basis. The coated test strips were then dried in an oven at approximately 135° C. and then cured for 20 minutes at 177° C.

The sag resistance properties of each strip were measured according to ASTM C473-95 after three cycles at 40° C./95% humidity for 12 hours followed by 21° C./50% humidity for 12 hours. The sag resistance was measured as total movement (TM) of the strip and as position relative to flat plane (PRFP). The total movement of the panel and the final position relative to flat plane are set forth in Table 5.

TABLE 5

| Strip | Composition | TM (cm) | PRFP (cm) |
|---|---|---|---|
| 1 | 5A | 2.080 | 2.159 |
| 2 | 5A | 3.289 | 3.432 |
| 3 | 5B | 2.507 | 2.746 |
| 4 | 5B | 2.223 | 2.469 |
| 5 | Control (no coating) | 4.376 | 4.267 |
| 6 | Control (no coating) | 4.747 | 4.656 |

As is apparent from the results set forth in Table 5, Compositions 5A and 5B, which contained a glass filler and a mica filler, respectively, exhibited approximately equivalent sag resistance as measured by total movement (TM) of the panel and as position relative to flat plane (PRFP).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A curable, formaldehyde free coating composition comprising:
   (i) a composition comprising (a) a polyacid copolymer comprising at least two carboxylic acid groups, anhydride groups, or salts thereof, (b) a hydroxyl group-containing compound bearing at least two hydroxyl groups as an independent compound or incorporated into the polyacid copolymer backbone, and (c) a phosphorus-containing catalyst; and
   (ii) calcium aluminosilicate powder having a total alkali content of less than about 2 wt. % based on the total weight of the calcium aluminosilicate powder, a median particle size of about 250 microns or less, and a surface area from about 1 m²/g to about 3 m²/g,
   wherein the ratio of the number of equivalents of said carboxylic acid groups, anhydride groups, or salts thereof to the number of equivalents of said hydroxyl groups is from about 1/0.01 to about 1/3.

2. The coating composition of claim 1, comprising about 20 wt. % to about 50 wt. % binder composition and about 40% wt. % to about 70 wt. % calcium aluminosilicate powder, based on the total weight of the dry components of the coating composition.

3. The coating composition of claim 1, wherein the hydroxyl group-containing compound is triethanolamine, and/or wherein the polyacid copolymer is a carboxylated acrylic copolymer.

4. The coating composition of claim 1, wherein the calcium aluminosilicate powder has a median particle size of about 20 microns or less.

5. The coating composition of claim 1, further comprising one or more components selected from the group consisting of dispersants, organic fillers, mineral fillers, pigments, surfactants, pH modifiers, buffer agents, viscosity modifiers, stabilizers, defoamers, flow modifiers, and combinations thereof.

6. The coating composition of claim 1, further comprising a filler selected from the group consisting of brighteners, clay, mica, sand, barium sulfate, silica, talc, gypsum, wollastonite, zinc oxide, zinc sulfate, hollow beads, and mixtures thereof; and/or one or more of a nonionic surfactant, and a kaolin clay.

7. The coating composition of claim 1, wherein the composition avoids formaldehyde emissions.

8. The coating composition of claim 1, wherein the calcium aluminosilicate powder has a median particle size of about 100 microns or less.

\* \* \* \* \*